United States Patent
Hui et al.

(10) Patent No.: US 9,716,528 B2
(45) Date of Patent: Jul. 25, 2017

(54) PER-CHANNEL ADAPTIVE CODE RATES IN CHANNEL-HOPPING NETWORKS

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 14/336,546

(22) Filed: Jul. 21, 2014

(65) Prior Publication Data

US 2016/0021647 A1    Jan. 21, 2016

(51) Int. Cl.
*H04B 1/713*    (2011.01)
*H04B 1/7143*   (2011.01)
*H04W 72/04*    (2009.01)
*H04L 1/00*     (2006.01)

(52) U.S. Cl.
CPC ........... *H04B 1/713* (2013.01); *H04B 1/7143* (2013.01); *H04L 1/0002* (2013.01); *H04L 1/0017* (2013.01); *H04W 72/044* (2013.01)

(58) Field of Classification Search
CPC ... H04B 1/713; H04W 72/082; H04W 72/044
See application file for complete search history.

(56) References Cited

U.S. PATENT DOCUMENTS

| | | | |
|---|---|---|---|
| 8,923,416 B2 | 12/2014 | Kim et al. | |
| 8,923,422 B2 | 12/2014 | Hui et al. | |
| 9,020,008 B2 | 4/2015 | Hui et al. | |
| 2011/0164514 A1* | 7/2011 | Afkhamie | H04W 52/367 370/252 |
| 2013/0016758 A1* | 1/2013 | Hui | H04W 72/005 375/134 |
| 2013/0250866 A1 | 9/2013 | Hui et al. | |
| 2013/0250969 A1 | 9/2013 | Hui et al. | |
| 2014/0098724 A1* | 4/2014 | Park | H04W 72/02 370/311 |

OTHER PUBLICATIONS

Vasseur et al., "Routing Metrics Used for Path Calculation in Low-Power and Lossy Networks", Internet Engineering Task Force (IETF), Mar. 2012, pp. 1-30.
"Link adaptation", http://en.wikipedia.org/wiki/Link_adaptation, May 24, 2014, 2 pages, Wikimedia Foundation, Inc.

* cited by examiner

*Primary Examiner* — Jackie Zuniga Abad
(74) *Attorney, Agent, or Firm* — Parker Ibrahim & Berg LLC; James M. Behmke; Stephen D. LeBarron

(57) ABSTRACT

In one embodiment, a channel on which a receiving node will receive a data packet that is transmitted at a particular time in a channel-hopping network is determined according to a channel-hopping receive schedule of the receiving node. Channel characteristics of the determined channel are computed. Then, a code rate of the data packet is selected based on the computed channel characteristics of the determined channel. After the code rate selection, the data packet is transmitted on the determined channel to the receiving node using the selected code rate.

25 Claims, 11 Drawing Sheets

PER-CHANNEL ADAPTIVE CODE RATES IN CHANNEL-HOPPING NETWORKS

TECHNICAL FIELD

The present disclosure relates generally to computer networks, and, more particularly, to per-channel adaptive code rates in channel-hopping networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Existing LLNs often utilize adaptive code rate mechanisms on a per-packet basis, as adaptive code rates can assist in increasing range and robustness of network devices. To this end, IEEE 802.15.4g-2012 introduces a Forward Error Correction (FEC) mechanism with a fixed code rate of 1/2. The Start-of-Frame Delimiter (SFD) is used to indicate whether or not FEC is enabled for a given packet. The FEC mechanism defined in IEEE 802.15.4g-2012 offers an actual gain of around 3 dB, which can be useful in enhancing communication range, particularly when the Signal-to-Noise Ratio (SNR) is low.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

OVERVIEW

According to one or more embodiments of the disclosure, a channel on which a receiving node will receive a data packet that is transmitted at a particular time in a channel-hopping network is determined according to a channel-hopping receive schedule of the receiving node. Channel characteristics of the determined channel are computed. Then, a code rate of the data packet is selected based on the computed channel characteristics of the determined channel. After the code rate selection, the data packet is transmitted on the determined channel to the receiving node using the selected code rate.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
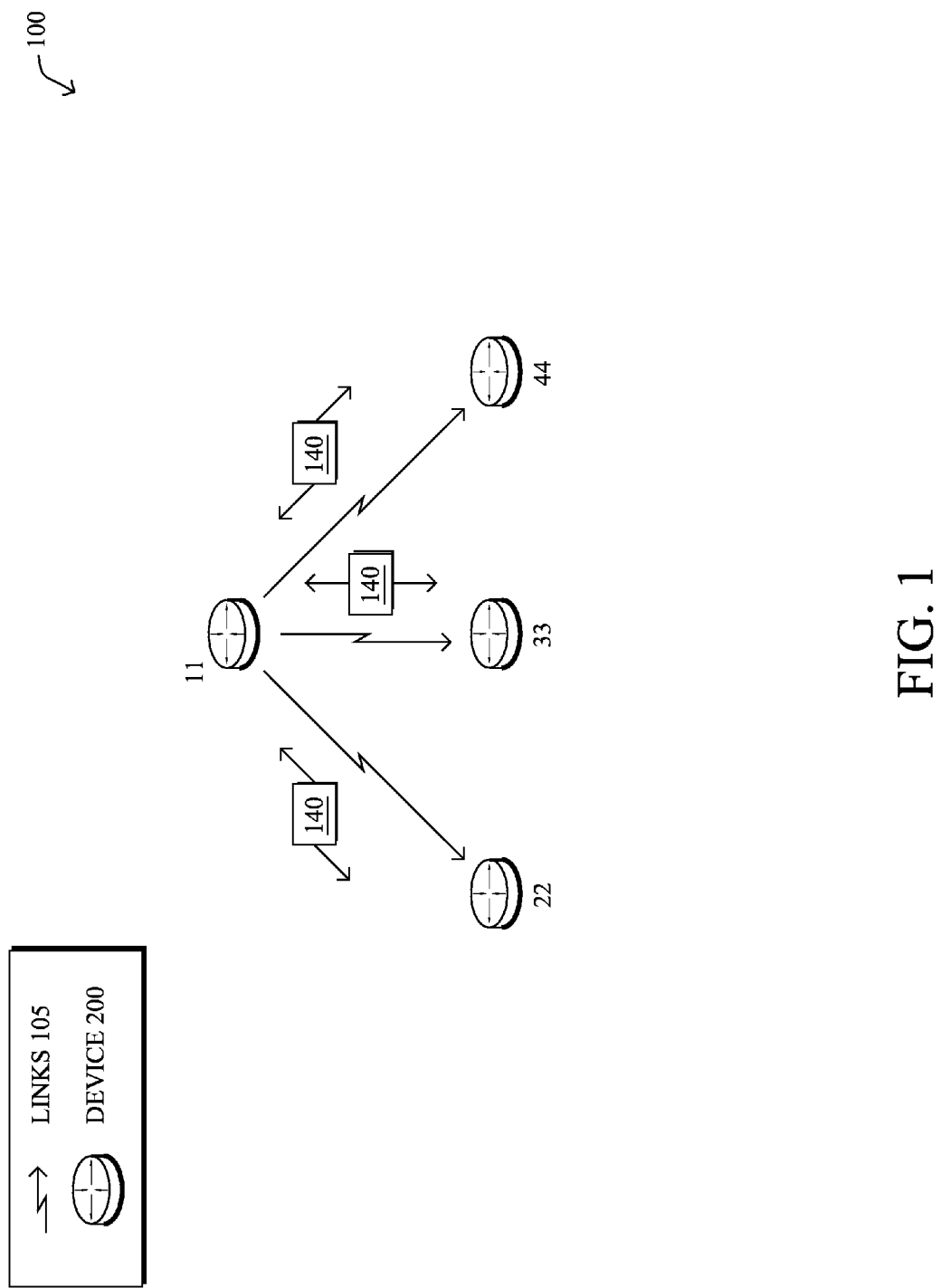
FIG. 1 illustrates an example communication network.

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. For the purposes of the present disclosure, the terms "node" and "device" may be applied interchangeably. In particular, certain nodes 200, such as, e.g., sensors, routers, computers, radios, etc., may be in communication with other nodes 200, e.g., based on distance, signal strength, current operational status, location, etc. In an illustrative Smart Grid AMI network, the nodes 200 may include various sensors, such as electricity meters, gas meters, heat meters, water meters, etc.

Those skilled in the art will understand that any number of nodes, devices, links, etc. may be used in the wireless network, and that the view shown herein is for simplicity (particularly, that while sensors are shown, any wireless communication devices 11-44 may be utilized). Also, while the embodiments are illustratively shown herein with reference to a generally wireless network, the description herein is not so limited, and may be applied to networks that have wired links, wireless links, PLC links, etc. Moreover, while the network is shown in a certain orientation, the network 100 is merely an example illustration that is not meant to limit the disclosure.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
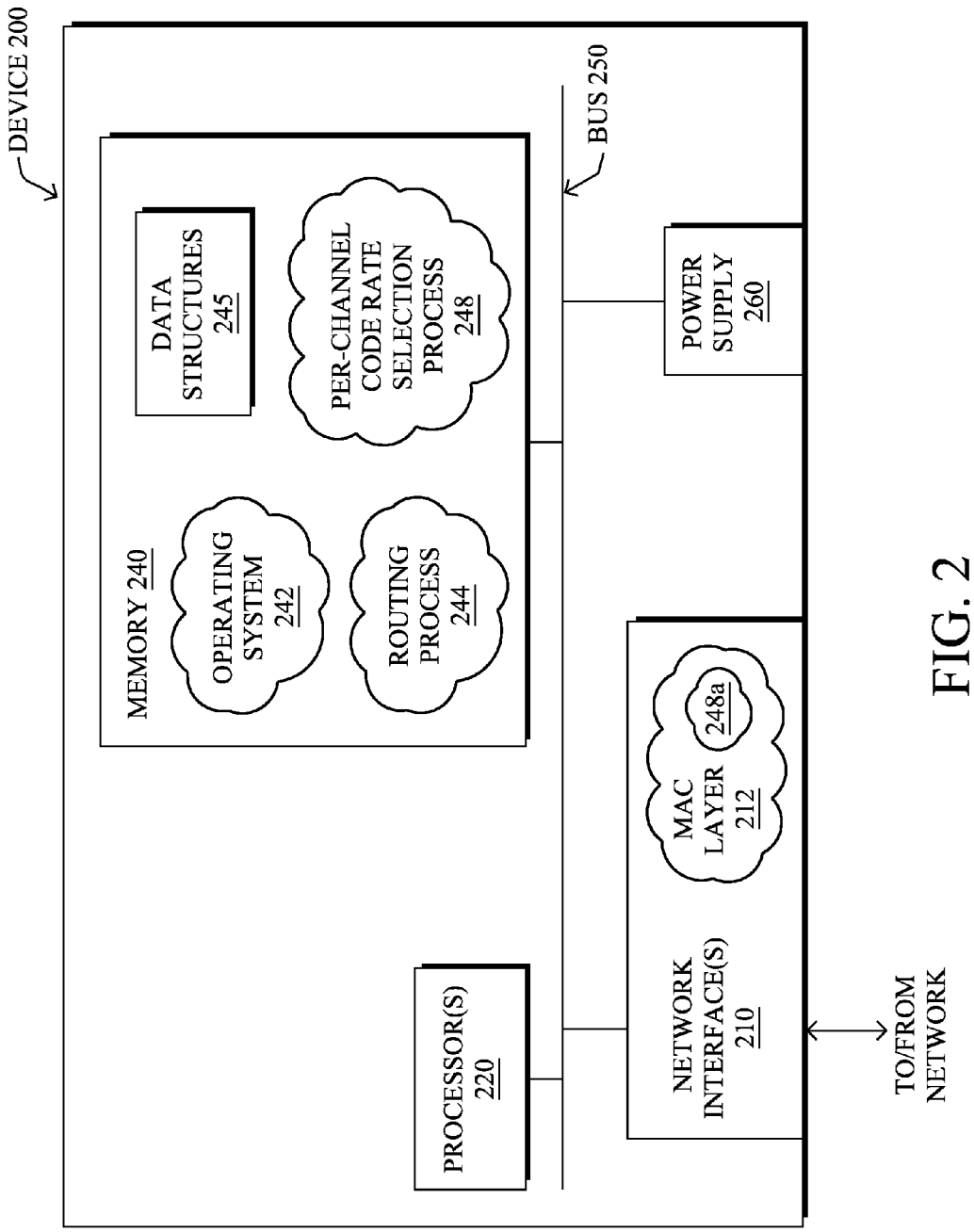
FIG. 2 illustrates an example network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), at least one processor 220, a memory 240, as well as a power supply 260 (e.g., plug-in, battery, etc.), all of which may be interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art. The device 200 may have multiple different types of network interfaces 210, e.g., wireless and wired/physical connections, and that the view herein is merely for illustration. Also, while the network interface 210 is shown separately from power supply 260, in the case of PLC, for example, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "per-channel code rate selection" process 248, as described herein. Note that while the per-channel code rate selection 248 is shown in centralized memory 240, alternative embodiments provide for the process, or portions thereof, to be specifically operated within the network interfaces 210, such as a component of a MAC layer 212 (process "248a"). It should be understand that myriad additional processes/applications may be stored within memory 240 as well, including, for example, routing process/services, a directed acyclic graph (DAG) formation process, etc.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which the routers, or more generally, the devices, have access to reduced resources, e.g., processing power, memory, and/or energy (battery). Also, their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

In many cases, LLN devices communicate using a frequency-hopping, or channel-hopping, link layer (the terms "frequency" and "channel" may be used interchangeably herein). This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
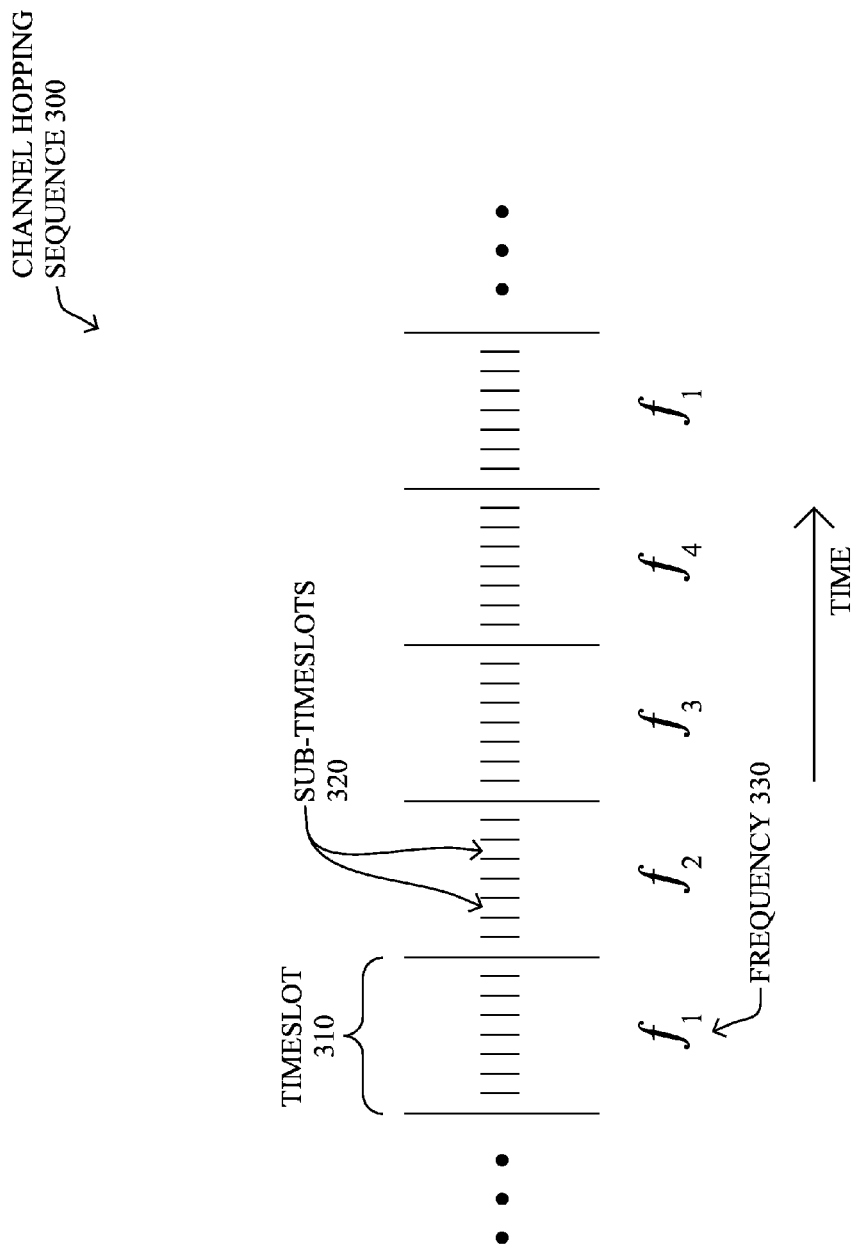
FIG. 3 illustrates an example channel-hopping sequence.

In general, as shown in FIG. 3, in frequency-hopping wireless networks, time frames are divided within a frequency-hopping sequence 300 into regular timeslots 310, each one operating on a different frequency 330 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e. all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 4:
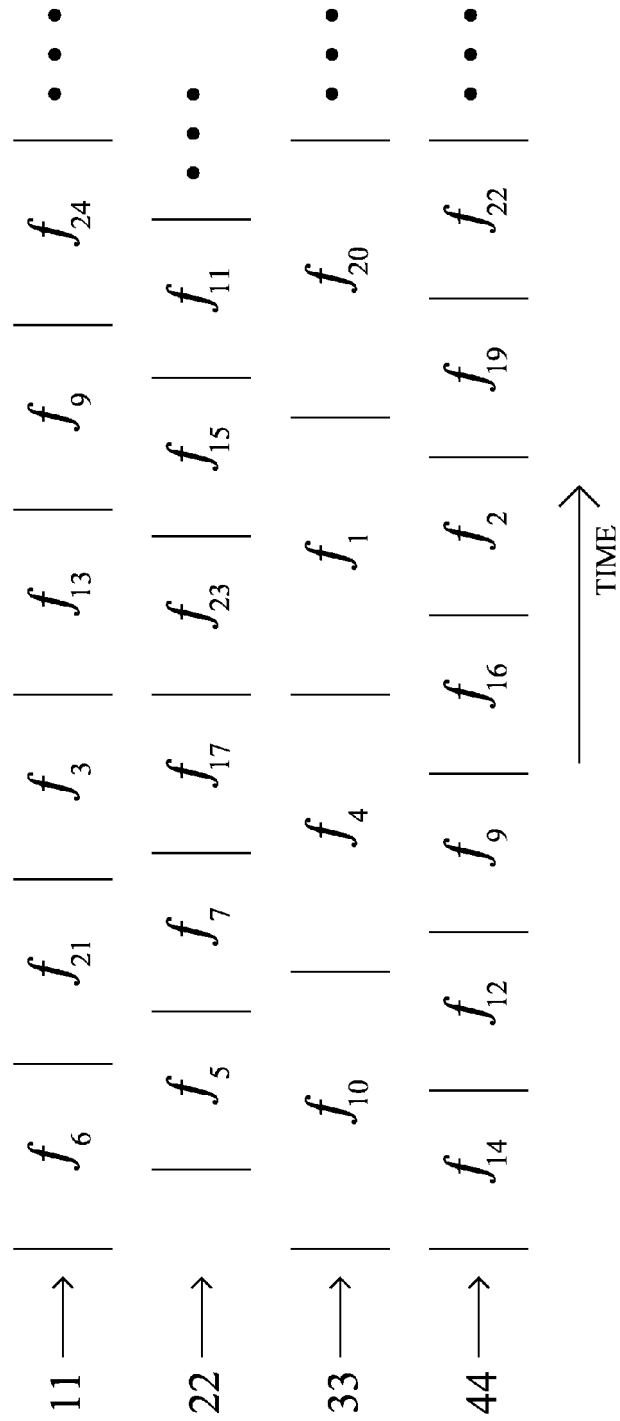
FIG. 4 illustrates example independently determined and independently timed channel-hopping sequences.

FIG. 4 illustrates an example of independently determined local unicast listening schedules 400 that may be independently computed by each individual device, "11," "22," "33," and "44," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

As noted above, IEEE 802.15.4g-2012 lays the foundation for allowing adaptive code rates on a per-packet basis. As is known in the art, a code rate typically represents the proportion of a data flow that is useful (e.g., non-redundant). In other words, where a code rate is k/n, for every k bits of useful information, the coder generates n bits of data, in total, of which n-k are redundant. IEEE 802.15.4g-2012 introduces a Forward Error Correction (FEC) mechanism with a fixed code rate of 1/2. The Start-of-Frame Delimiter (SFD) is used to indicate whether or not FEC is enabled for a given packet. The FEC mechanism defined in IEEE 802.15.4g-2012 offers an actual gain of around 3 dB, which can be useful to increase range and robustness when the Signal-to-Noise Ratio (SNR) is low.

Attaining increased range using existing IEEE 802.15.4g-2012 hardware is an important need in LLNs. Thus, adaptive code rates can be utilized in this respect in order to increase range and robustness. In particular, the FEC can be highly useful in providing extra communication range. However, the FEC is not necessary in all conditions and all channels, such as channels with a relatively high link quality.

Per-Channel Adaptive Code Rates in Channel-Hopping Networks

The techniques herein propose dynamically adjusting the code rate for each packet based on channel-hopping schedule of the receiving device. This disclosure involves, for instance: (i) providing an indicator in the packet's header (e.g., as a start frame delimiter (SFD) or Information Element) to indicate the actual code rate of the packet's payload, (ii) maintaining per-channel link quality information for neighboring devices, (iii) having the sender adjust a packet's code rate based on the receiver's current reception parameters (e.g., channel, modulation, symbol rate, etc.) and channel's link quality information, (iv) allowing a transmitter to delay transmission of latency-tolerant packets if costs of transmitting in the current slot are too high (e.g., too low a code rate), and (v) including per-channel code-rate information in routing a packet to select routes based on the code rates.

Specifically, according to one or more embodiments of the disclosure as described in detail below, a channel on which a receiving node will receive a data packet that is transmitted at a particular time in a channel-hopping network is determined according to a channel-hopping receive schedule of the receiving node. Channel characteristics of the determined channel are computed. Then, a code rate of the data packet is selected based on the computed channel characteristics of the determined channel. After the code rate selection, the data packet is transmitted on the determined channel to the receiving node using the selected code rate.

Illustratively, the techniques described herein may be performed by hardware, software, and/or firmware, such as in accordance with the "per-channel code rate selection" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various wireless communication protocols or IEEE 802.15.4g-2012-based protocols, and as such, may be processed by similar components understood in the art that execute those protocols, accordingly.

Operationally, mechanisms are disclosed herein for adjusting the code rate on a per-packet and per-channel basis in channel-hopping networks. The disclosed embodiments build on the foundation that IEEE 802.15.4g-2012 provides by introducing additional code rate options (e.g., beyond on/off). To this end, a device can monitor the condition of channels to each neighboring device and select a code rate based on the receiver's current receive settings and channel conditions. A device can also choose whether or not to transmit a packet based on the perceived channel utilization on that link, as well as the packet's priority.

Notably, the disclosed mechanisms allow the transmitter to adjust the data rate on a per-packet and per-channel basis. Along these lines, IEEE 802.15.4g-2012-based mechanisms transmit a given packet using only one channel and the packet transmission duration may far exceed the dwell time used while listening. Therefore, the link adaptation described herein involves transmitting a single packet on a single channel that is dictated by the receiver and the time of transmission. Because each packet is transmitted on a single channel, the disclosed embodiments offer the opportunity to dynamically select the code rate given the channel being used to communicate the packet. This results in per-packet code rate adaptation based on the receiver and the receiver's current channel.

Also, because each receiver independently dictates its own channel-hopping schedule, the transmitter maintains link quality information for each channel to a given neighbor. As such, the transmitter can dynamically choose the code rate according to the quality of the channel that is being used to transmit the packet. Therefore, a device can utilize higher data rates when transmitting on channels that provide better link quality and utilize lower data rates when transmitting on channels that provide lower link quality.

Figure 5:
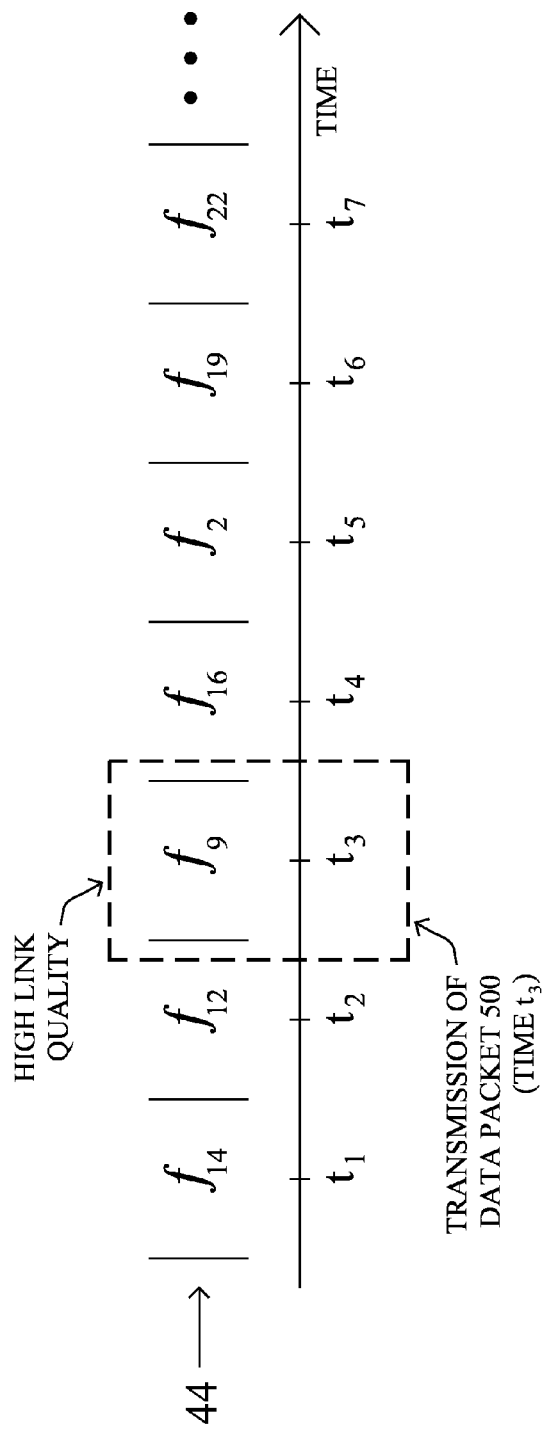
FIG. 5 illustrates an example of computing a high link quality of a channel according to receive schedule of a receiving node.

FIG. 5 illustrates an example of computing a high link quality of a channel according to receive schedule of a receiving node. As shown in FIG. 5, the device "44" represents the "receiving node" (for illustration purposes), and a receive (or listening) schedule of the receiving node indicates multiple channels on which the receiving node will receive a data packet that is transmitted at a particular time (e.g., $t_1$-$t_7$). For instance, the receive schedule 400 of the receiving node "44" indicates that the receiving node is configured to receive data transmissions on channel (or frequency) $f_{14}$ at time $t_1$, on channel $f_{12}$ at time $t_2$, on channel $f_9$ at time $t_3$, and so forth. As explained above, the receiving node, as well as other nodes in the channel-hopping network, independently computes its own receive schedule 400. A device can synchronize its receive schedule 400 with another device by communicating its channel sequence, time slot duration, and current time within the schedule. Receive schedule parameters may be communicated in explicit synchronization packets and/or piggybacked on existing data packets. Devices may then store these parameters to know which channel to use for transmitting to the receiving node at a particular time.

Figure 6:
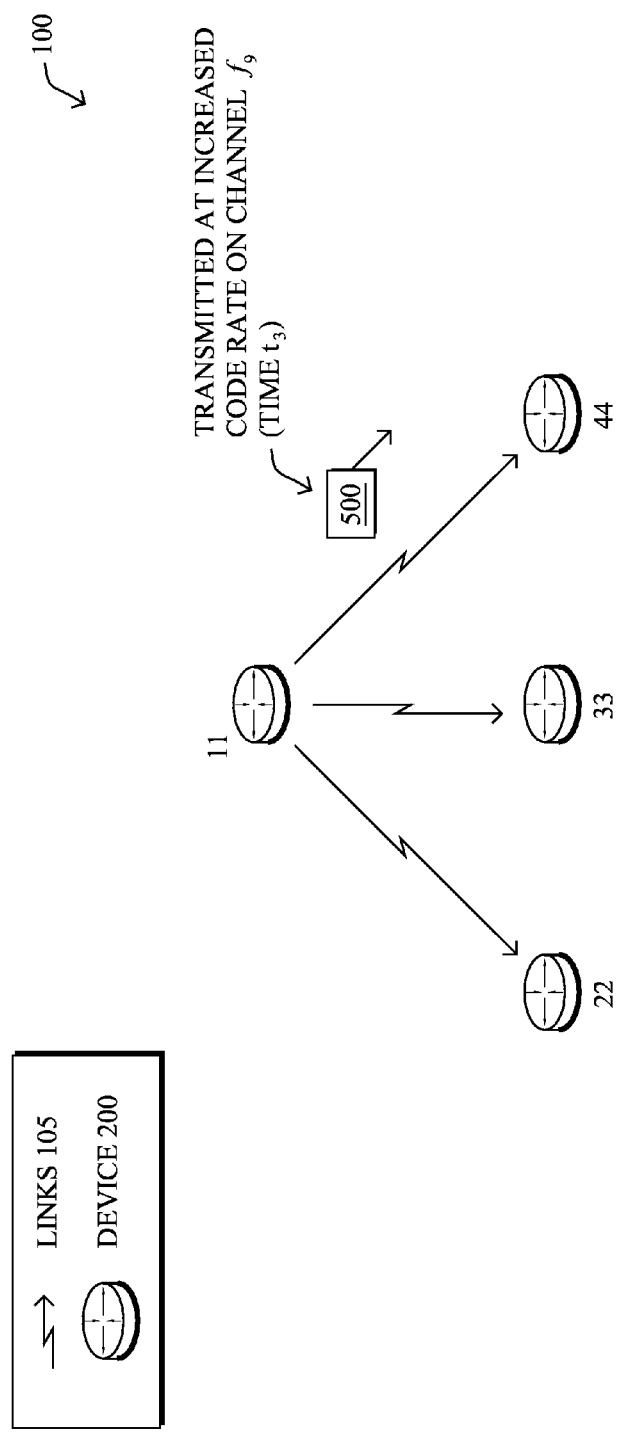
FIG. 6 illustrates an example of adaptively transmitting a data packet using an increased code rate.

Based on the receive schedule 400 of the receiving node "44", a "sending node," which represents a node transmitting a data packet, may determine a channel on which the receiving node will receive a data packet that is transmitted at a particular time. As shown in FIG. 6, the sending node and the receiving node may neighbor one another. The data packet may be generated at and transmitted from the sending node, or the sending node may be forwarding a data packet which was received from another node. Illustratively, the sending node "11" determines that the receiving node "44" may receive data transmission 500 on channel $f_9$ at time $t_3$. Time $t_3$ may represent the current time or a future time at which a transmission is planned.

After determining the channel (e.g., $f_9$) on which the receiving node can receive a data packet at a particular time (e.g., $t_3$), the sending node may compute channel characteristics of the determined channel. The sending node may actively and continuously monitor the channel characteristics of each channel designated in the channel-hopping receive schedule 400 of the receiving node. Alternatively, the sending node may compute the channel characteristics of the determined channel on a per-transmission basis.

For instance, the sending node may compute the channel characteristics of the determined channel (e.g., $f_9$) by determining a quality of the channel. The quality of the channel may be measured using any metric suitable for indicating transmission quality. For example, the channel quality may be computed according to a transmission success/failure rate. Similarly, the channel quality may be computed using an expected transmission count (ETX) metric, which represents the number of expected transmissions for a data packet to be received without error at its destination. Similarly, the channel quality may be computed using metrics, such as SNR, RSSI, LQI, and the like. In addition, channel characteristics may be computed by determining one or more reception parameters of the determined channel. For example, the reception parameters may include any one or more of a symbol rate, a baud rate, a modulation rate, a bandwidth amount, and a bit rate of the determined channel. Notably, mesh networks can include link quality information in acknowledgment packets, thus providing the needed channel quality information to the sending node.

FIG. 6 illustrates an example of adaptively transmitting a data packet using an increased code rate. As shown in FIG. 6, the sending node "11" can transmit the data packet 500 to the receiving node "44" on the determined channel $f_9$ at the time $t_3$ using an increased code rate. First, the sending node may select a code rate for the data packet 500 based on the computed channel characteristics of the determined channel. Illustratively, as shown in FIG. 5, the determined channel $f_9$ is determined to have a high link quality at time $t_3$, based on the channel quality determination techniques described above. Thus, based on the high link quality of the channel $f_9$, an increased code rate may be selected.

In this regard, in response to the computed channel characteristics of the determined channel indicating a high link quality, a first (increased) code rate of the data packet may be selected. Conversely, in response to the computed channel characteristics of the determined channel indicating a low link quality, a second (decreased) code rate of the data packet may be selected. That is, the first code rate corresponding to the higher channel quality is higher than the second code rate corresponding to the lower channel quality.

The code rate selection process may take additional factors into consideration. For example, the selection of the code rate of the data packet 500 may further depend on a size of the data packet 500 or how often the receiving device is hopping between channels based on the channel-hopping schedule 400.

As described above, each device independently defines its own channel-hopping schedule (and optionally modulation/symbol rate hopping schedule) for receiving packets. Thus, the sending node must use the reception parameters that the receiving node is currently tuned to at the time of starting the packet transmission. Using link quality information and the channel reception parameters, the sending device can determine the optimal code rate (e.g., one that maximizes throughput and maintains a good transmission success rate). For example, on channels that experience deep fading, the sending device may choose a lower code rate, while on channels that experience good SNR, the sending device may choose a higher code rate.

Notably, IEEE 802.15.4g-2012 specifies the use of the Start-of-Frame Delimiter (SFD) to indicate whether Forward Error Correction (FEC) is enabled or not. When enabled, IEEE 802.15.4g-2012 uses a code rate of 1/2. The disclosed embodiments build on this by introducing additional code rates to give the transmitter (e.g., sending node) greater choice in the code rate selection process. Any flexible coding mechanism, such as Reed-Solomon, Turbo Codes, multi-level/nested codes, and so forth, may be utilized in adaptively selecting the code rate. Additional SFD values may be used to indicate other code rates. Additionally, or alternatively, the code rate may be encoded using an IEEE 802.15.4e-2012 Information Element, and the MAC payload can be coded as indicated by the Information Element. That is, a code rate indicator can be encoded in the data packet 500 that is indicative of the selected code rate.

Then, as shown in FIG. 6, the data packet 500 may be transmitted from the sending node to the receiving node (on channel $f_9$) using the selected increased code rate. Accordingly, an optimal code rate (e.g., one that maximizes the transmission success rate) can be used to transmit the packet 500. Furthermore, the optimal code rate can be determined on a per-packet and per-channel basis, meaning the optimal code rate can be adapt to any given time for any particular packet based on the receiving node's active channel conditions at the given time.

Figure 7:
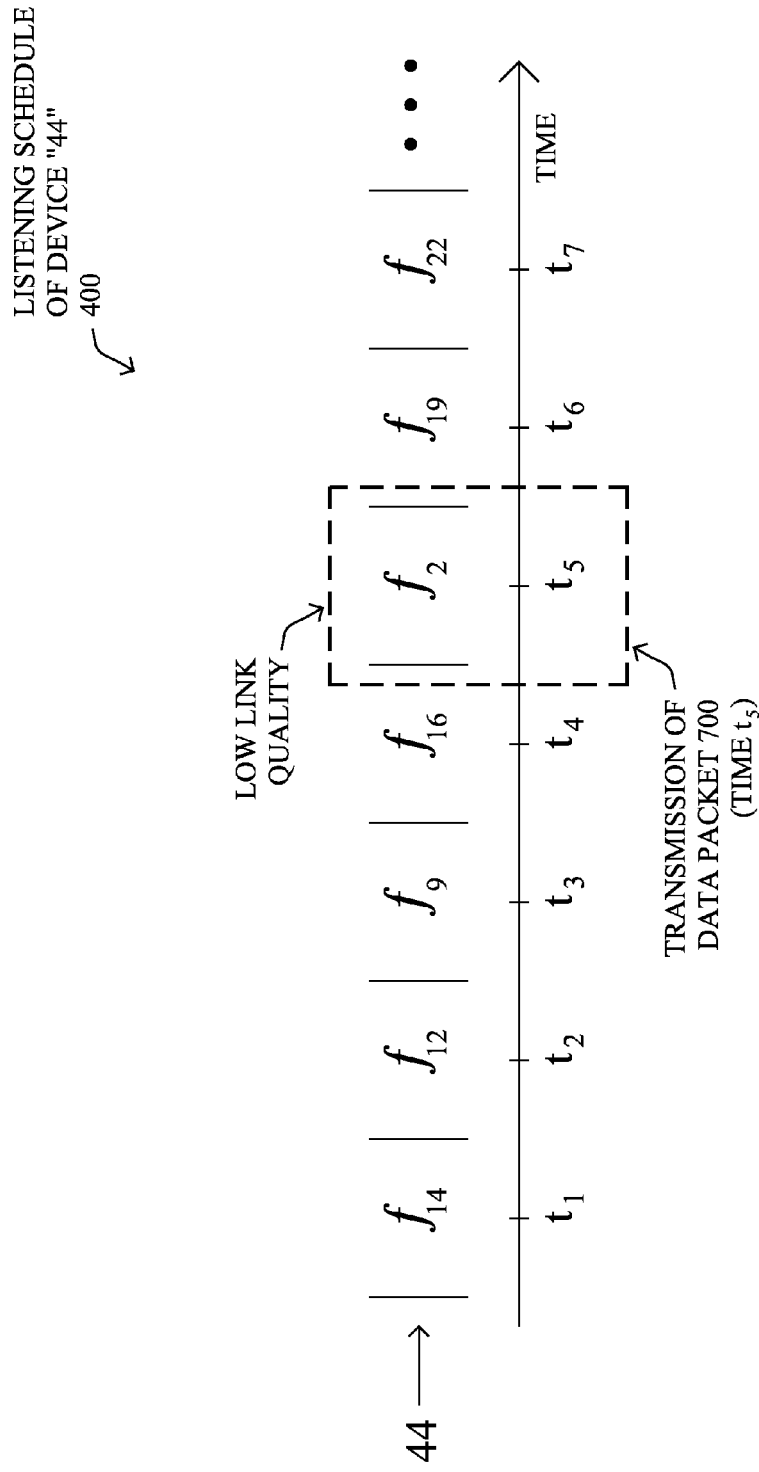
FIG. 7 illustrates an example of computing a low link quality of a channel according to receive schedule of a receiving node.
Figure 8:
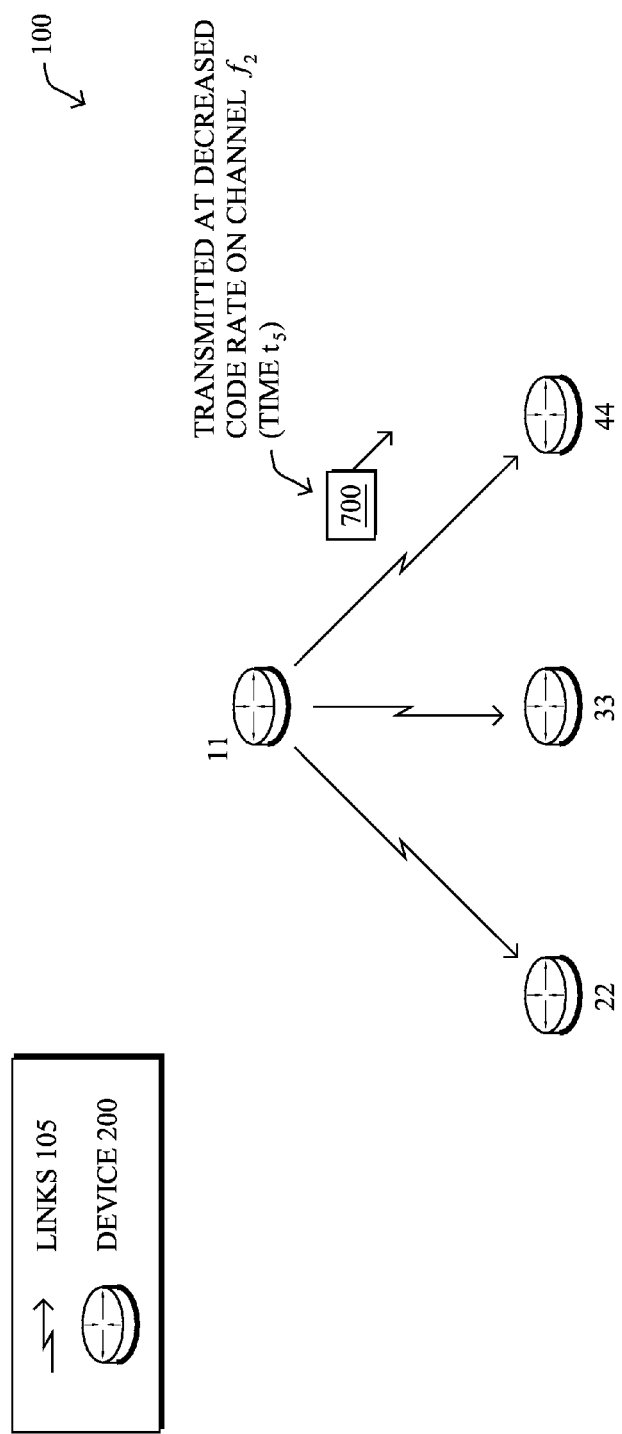
FIG. 8 illustrates an example of adaptively transmitting a data packet using a decreased code rate.

FIG. 7 illustrates an example of computing a low link quality of a channel according to receive schedule of a receiving node, and FIG. 8 illustrates an example of adaptively transmitting a data packet using a decreased code rate. That is, FIGS. 7 and 8 represent a scenario that is opposite to that of FIGS. 5 and 6, where in contrast to FIGS. 5 and 6, the link quality of the determined channel is poor. To this point, as shown in FIG. 7, it may be determined that at time $t_5$, the receiving node may receive a new data packet 700 on channel $f_2$. Then, channel characteristics of channel $f_2$ may be computed, where, illustratively, the sending node determines that the channel $f_2$ has a low link quality. Thus, a decreased code rate for the packet 700 may be selected. Then, as shown in FIG. 8, the packet 700 may be transmitted from the sending node to the receiving node on the channel $f_2$ at (or close to) time $t_5$ using the selected decreased code rate.

Figure 9:
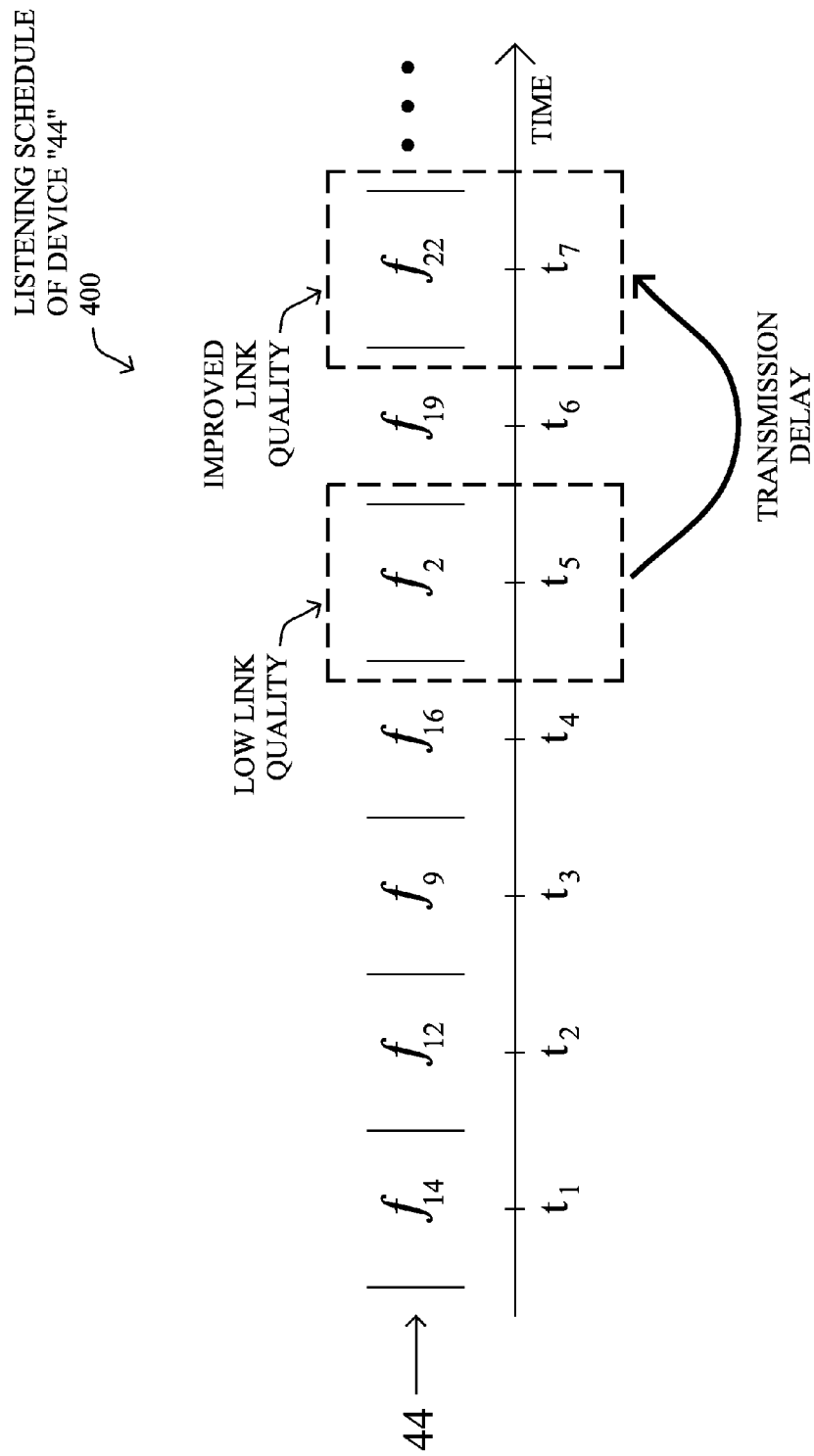
FIG. 9 illustrates an example of delayed transmission based on the channel characteristics.

FIG. 9 illustrates an example of delayed transmission based on the channel characteristics. In this respect, the sending node may choose to delay the transmission of a data packet to the receiving node based on the computed channel characteristics of the determined channel so as to transmit the data packet at a subsequent time on a channel different than the determined channel. For example, as shown in FIG. 9, a transmission time of $t_5$ may be originally contemplated by the sending node, but due to the low link quality of channel $f_2$, which corresponds to time $t_5$ according to the receive schedule 400 of the receiving device, the sending node may choose to delay the transmission of the packet until time $t_7$, at which point the receiving node can receive the data packet on a channel (e.g., $f_{22}$) exhibiting a link quality that is improved beyond that of the previous channel. Thus, the sending node is allowed to delay transmission when a given channel does not provide favorable characteristics, or when the transmission of latency-tolerant packets is too costly. The downside of decreasing the code rate of a packet is that the transmission duration increases, thereby increasing channel utilization and energy consumption. On the other hand, by delaying transmission of the packet, a device can reduce overall channel utilization and energy consumption, particularly when other channels provide much better link quality.

By allowing for per-packet code rate adaptation, improved latency and channel utilization can be achieved by selectively delaying transmission. For instance, when transmitting a packet, the sending node can choose to transmit now on channel A or later on channel B. Depending on the channel conditions, size of the packet, and how often the receiver is hopping between channels, the expected latency and channel utilization may be smaller using either approach. That is, the sending node may choose to transmit now, but because channel quality is poor, may spend time transmitting the long packet with high redundancy (e.g., hundreds of milliseconds). On the other hand, the sending node may choose to wait a period of time, such as 20 ms (e.g., one dwell interval), for example, and transmit the long packet with low redundancy. This capability is made possible by performing per-channel code rate adaptation.

Figure 10:
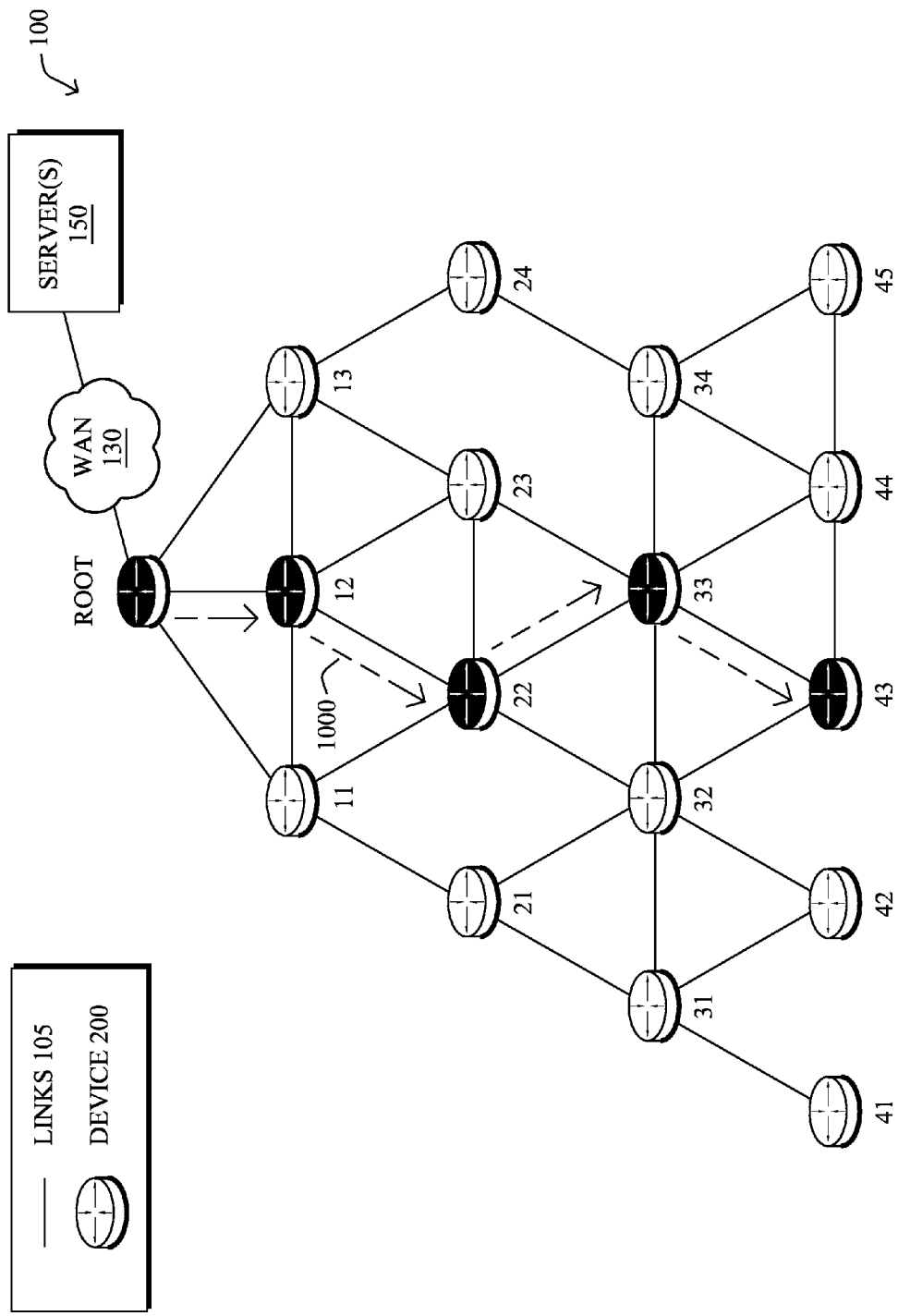
FIG. 10 illustrates an example transmission route constructed based on a selected code rate.

FIG. 10 illustrates an example transmission route constructed based on a selected code rate. As shown in FIG. 10, a transmission route 1000 includes a source (e.g., root node), a destination (e.g., node "43"), and one or more intermediate hops. Notably, the code rate that is selected based on the computed channel characteristics, according to the process described above, can be used to affect a routing decision in the channel-hopping network. Thus, the transmission route 1000 can be constructed using the selected code rate.

For instance, upon expiration of a timer, such as a Trickle-based timer, or a predetermined threshold, the selected code information could be added to a DODAG Information Object (DIO) (i.e., a type of DAG discovery message that carries information allowing a node to discover a RPL instance, learn its configuration parameters, select a DODAG parent set, and maintain the upward routing topology) along a path, which could then be used for next-hop selection. Also, by recording a metric as specified in RFC 6551, as an example, a node could record a DIO by adding per-channel quality. In such a case, a node would have visibility on per-link channel quality and consequently the current code rate chosen by each nodes along a given path, which may lead the node to potentially tune its next hop selection having knowledge of the select code rates at each hop along the path.

Figure 11:
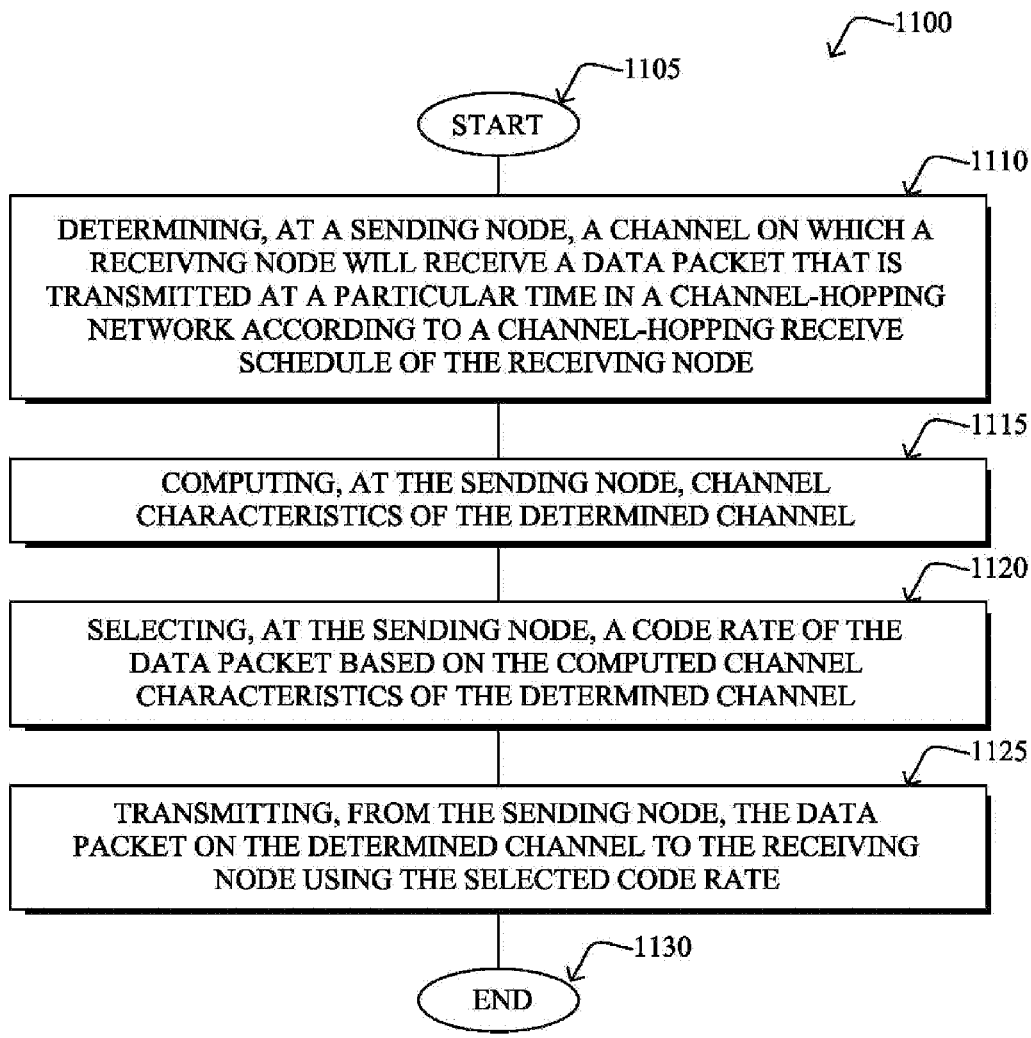
FIG. 11 illustrates an example simplified procedure for per-channel adaptive code rates in channel-hopping networks.

FIG. 11 illustrates an example simplified procedure for per-channel adaptive code rates in channel-hopping networks in accordance with one or more embodiments described herein. The procedure 1100 may start at step 1105, and continues to step 1110, where, as described in greater detail above, a quality of a channel for a receiving node at a particular time may be computed, and a code rate for a data packet may be selected based on the channel quality.

At step 1110, a channel on which a receiving node will receive a data packet that is transmitted at a particular time in a channel-hopping network is determined according to a channel-hopping receive schedule of the receiving node. The determination may be made by a sending node (e.g., a node that receives and forwards or creates and transmits a data packet) in the channel-hopping network. The sending node and the receiving node may neighbor one another, for example.

At step 1115, channel characteristics of the determined channel are computed. As explained above, the channel characteristics may be measured using any metric suitable for indicating transmission quality. For example, the channel quality may be computed according to a transmission success/failure rate. Similarly, the channel quality may be computed using an expected transmission count (ETX) metric, which represents the number of expected transmissions for a data packet to be received without error at its destination. In addition, channel characteristics may be computed by determining one or more reception parameters of the determined channel. For example, the reception parameters may include any one or more of a symbol rate, a baud rate, a modulation rate, a bandwidth amount, and a bit rate of the determined channel.

Then, at step 1120, a code rate of the data packet is selected based on the computed channel characteristics of the determined channel. For example, in response to the computed channel characteristics of the determined channel indicating a high link quality, a first (increased) code rate of the data packet may be selected. Conversely, in response to the computed channel characteristics of the determined channel indicating a low link quality, a second (decreased) code rate of the data packet may be selected. That is, the first code rate corresponding to the higher channel quality is higher than the second code rate corresponding to the lower channel quality. The code rate may be determined by the sending node, for example.

After the code rate selection, at step 1125, the data packet is transmitted from the sending node on the determined channel to the receiving node using the selected code rate. Accordingly, an optimal code rate (e.g., one that maximizes the transmission success rate) can be used to transmit the packet. Furthermore, the optimal code rate can be determined on a per-packet and per-channel basis, meaning the optimal code rate can be adapt to any given time for any particular packet based on the receiving node's active channel conditions at the given time.

The procedure illustrative ends at step 1130. The techniques by which the steps of procedure 1100 may be performed, as well as ancillary procedures and parameters, are described in detail above.

It should be noted that the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow channel-hopping mesh devices to better utilize varying channel conditions especially when maximizing communication range. In Smart Grid AMI mesh networks, for example, the physical location of devices may be severely constrained and maximizing communication range becomes a priority. Thus, allowing devices to track per-channel link quality and adjust code rate on a per-packet basis using the link quality information allows a device to take advantage of higher data rates on good quality channels, while still allowing communication at lower data rates on poor quality channels. The disclosed techniques also reduce channel utilization and energy consumption by allowing devices to delay transmission when a given channel does not provide good enough quality. As a result, a communication range can be maximized while reducing channel utilization and energy consumption.

While there have been shown and described illustrative embodiments that provide for per-channel adaptive code rates in channel-hopping networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, at a sending node, a channel on which a receiving node will receive a data packet that is transmitted at a particular time in a channel-hopping network according to a channel-hopping receive schedule of the receiving node;
    maintaining, at the sending node, link quality information for each channel to a given neighboring node;
    computing, at the sending node, channel characteristics of the determined channel based on the link quality information maintained by the sending node;
    selecting, at the sending node, a code rate of the data packet based on the computed channel characteristics of the determined channel, wherein the code rate is selected on a per-packet and per-channel basis; and
    transmitting, from the sending node, the data packet on the determined channel to the receiving node using the selected code rate.

2. The method as in claim 1, further comprising:
    monitoring channel characteristics of each channel designated in the channel-hopping receive schedule of the receiving node.

3. The method as in claim 1, wherein the channel-hopping receive schedule of the receiving node is independently defined by the receiving node.

4. The method as in claim 1, further comprising:
in response to the computed channel characteristics of the determined channel indicating a high link quality, selecting a first code rate of the data packet; and
in response to the computed channel characteristics of the determined channel indicating a low link quality, selecting a second code rate of the data packet,
wherein the first code rate is higher than the second code rate.

5. The method as in claim 1, further comprising:
delaying the transmitting of the data packet to the receiving node based on the computed channel characteristics of the determined channel so as to transmit the data packet at a subsequent time on a channel different than the determined channel.

6. The method as in claim 1, wherein the computing of the channel characteristics of the determined channel comprises:
determining a transmission success rate of the determined channel.

7. The method as in claim 1, wherein the computing of the channel characteristics of the determined channel comprises:
determining one or more reception parameters of the determined channel including one or more of a symbol rate, a baud rate, a modulation rate, a bandwidth amount, and a bit rate.

8. The method as in claim 1, wherein the selecting of the code rate of the data packet is further based on a size of the data packet or how often the receiving device is hopping between channels.

9. The method as in claim 1, wherein the code rate of the data packet is selected so as to maximize a transmission success rate.

10. The method as in claim 1, wherein the selected code rate is used to make a routing decision in the channel-hopping network.

11. The method as in claim 1, wherein the sending node and the receiving node are neighboring nodes in the channel-hopping network.

12. The method as in claim 1, further comprising:
encoding a code rate indicator in the data packet that is indicative of the selected code rate.

13. An apparatus, comprising:
one or more network interfaces to communicate with a channel-hopping network;
a processor coupled to the one or more network interfaces and adapted to execute a process; and
a memory configured to store program instructions which include the process executable by the processor, the process comprising:
determining, as a sending node, a channel on which a receiving node will receive a data packet that is transmitted at a particular time in the channel-hopping network according to a channel-hopping receive schedule of the receiving node;
maintaining, as the sending node, link quality information for each channel to a given neighboring node;
computing, at the sending node, channel characteristics of the determined channel based on the link quality information maintained by the sending node;
selecting, at the sending node, a code rate of the data packet based on the computed channel characteristics of the determined channel, wherein the code rate is selected on a per-packet and per-channel basis; and
transmitting, from the sending node, the data packet on the determined channel to the receiving node using the selected code rate.

14. The apparatus as in claim 13, wherein the process further comprises:
monitoring channel characteristics of each channel designated in the channel-hopping receive schedule of the receiving node.

15. The apparatus as in claim 13, wherein the channel-hopping receive schedule of the receiving node is independently defined by the receiving node.

16. The apparatus as in claim 13, wherein the process further comprises:
in response to the computed channel characteristics of the determined channel indicating a high link quality, selecting a first code rate of the data packet; and
in response to the computed channel characteristics of the determined channel indicating a low link quality, selecting a second code rate of the data packet,
wherein the first code rate is higher than the second code rate.

17. The apparatus as in claim 13, wherein the process further comprises:
delaying the transmitting of the data packet to the receiving node based on the computed channel characteristics of the determined channel so as to transmit the data packet at a subsequent time on a channel different than the determined channel.

18. The apparatus as in claim 13, wherein the computing of the channel characteristics of the determined channel comprises:
determining a transmission success rate of the determined channel.

19. The apparatus as in claim 13, wherein the computing of the channel characteristics of the determined channel comprises:
determining one or more reception parameters of the determined channel including one or more of a symbol rate, a baud rate, a modulation rate, a bandwidth amount, and a bit rate.

20. The apparatus as in claim 13, wherein the selecting of the code rate of the data packet is further based on a size of the data packet or how often the receiving device is hopping between channels.

21. The apparatus as in claim 13, wherein the code rate of the data packet is selected so as to maximize a transmission success rate.

22. The apparatus as in claim 13, wherein the selected code rate is used to make a routing decision in the channel-hopping network.

23. The apparatus as in claim 13, wherein the sending node and the receiving node are neighboring nodes in the channel-hopping network.

24. The apparatus as in claim 13, wherein the process further comprises:
encoding a code rate indicator in the data packet that is indicative of the selected code rate.

25. A tangible non-transitory computer readable medium storing program instructions that cause a computer to execute a process, the process comprising:
determining, at a sending node, a channel on which a receiving node will receive a data packet that is transmitted at a particular time in a channel-hopping network according to a channel-hopping receive schedule of the receiving node;

maintaining, at the sending node, link quality information for each channel to a given neighboring node;

computing, at the sending node, channel characteristics of the determined channel based on the link quality information maintained by the sending node;

selecting, at the sending node, a code rate of the data packet based on the computed channel characteristics of the determined channel, wherein the code rate is selected on a per-packet and per-channel basis; and transmitting, from the sending node, the data packet on the determined channel to the receiving node using the selected code rate.

\* \* \* \* \*